United States Patent
Wang et al.

(10) Patent No.: US 8,311,325 B2
(45) Date of Patent: Nov. 13, 2012

(54) METHOD OF DETECTING AND RECTIFYING RED-EYES AUTOMATICALLY WHEN TAKING PHOTOS

(75) Inventors: Yi Wang, Shanghai (CN); Fuhui Lin, Cupertino, CA (US)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 267 days.

(21) Appl. No.: 12/615,882

(22) Filed: Nov. 10, 2009

(65) Prior Publication Data

US 2010/0124374 A1 May 20, 2010

Related U.S. Application Data

(63) Continuation of application No. PCT/CN2008/071009, filed on May 19, 2008.

(30) Foreign Application Priority Data

May 17, 2007 (CN) .......................... 2007 1 0040778

(51) Int. Cl.
*G06K 9/00* (2006.01)
(52) U.S. Cl. ...................................... 382/167
(58) Field of Classification Search .......... 382/162, 382/167, 254, 274; 396/123, 158; 348/221.1–224.1, 348/252, 371
See application file for complete search history.

(56) References Cited

U.S. PATENT DOCUMENTS

| | | | |
|---|---|---|---|
| 7,042,505 B1 | 5/2006 | DeLuca | |
| 7,133,070 B2 * | 11/2006 | Wheeler et al. | 348/223.1 |
| 7,414,667 B2 * | 8/2008 | Ichimasa | 348/371 |
| 7,843,494 B2 * | 11/2010 | Uemura et al. | 348/222.1 |
| 8,045,037 B2 * | 10/2011 | Ichimasa | 348/333.04 |
| 2005/0192799 A1 | 9/2005 | Kim et al. | |
| 2006/0120599 A1 | 6/2006 | Steinberg et al. | |

FOREIGN PATENT DOCUMENTS

| | | |
|---|---|---|
| CN | 1595454 | 3/2005 |
| JP | 2003-30647 | 1/2003 |
| JP | 2005-167697 | 6/2005 |
| JP | 2006-285944 | 10/2006 |

* cited by examiner

*Primary Examiner* — Jose Couso
(74) *Attorney, Agent, or Firm* — Dorsey & Whitney LLP

(57) ABSTRACT

The present invention discloses a method for automatically detecting and correcting red eye in a photo taking process. The method utilizes a preview function which all of the current digital cameras have. When flash light is needed during the photo taking process, an image which is closest to the shutter pressing time is read from a preview image sequence and this image is stored. Then, red eye detection is performed according to various related information (e.g., chroma information) of this image and the image actually taken. A correction process is conducted on the detected red eye area. The corrected image is stored as a resulting image in a storage unit in the camera. Therefore, the red eye is removed rapidly and accurately during a single normal exposure process and the image without red eye is thus obtained.

6 Claims, 4 Drawing Sheets

METHOD OF DETECTING AND RECTIFYING RED-EYES AUTOMATICALLY WHEN TAKING PHOTOS

CROSS REFERENCE TO RELATED APPLICATION(S)

This application is a continuation of International Patent Application No. PCT/CN2008/071009 filed on May 19, 2008, which claims priority to Chinese Application No. 200710040778.5, filed on May 17, 2007, the entire contents of both of which are incorporated herein by reference.

FIELD OF THE INVENTION

The present invention relates to a method for digital image processing, and more specifically, to a method for automatically detecting and removing red eye during photo taking.

BACKGROUND

Generally, in the case of weak light, people's eye may look red when using flash lamp to take photos. This is called "red eye effect". Red eye effect occurs due to the reflection of blood vessels on the retina when the incoming light emitted by the flash lamp is very strong. However, since the digital camera is getting smaller and smaller, the distance between the flash lamp and the lens becomes shorter and shorter. Such problem is increasingly significant.

Nowadays, many cameras have been equipped with auto anti-red eye function. Such function can be categorized into two types of techniques. One is to prevent red eye using a pre-flash. The other is to perform image processing to remove red eye.

CN patent application No. CN 1100814A (published on Mar. 29, 1995) discloses an apparatus which uses pre-flash to make the pupil contracted and reduces the reflected red light. However, such apparatus can only mitigate the red eye effect to some extent, and it cannot remove the red eye thoroughly. Moreover, since pre-flash can make people look unnatural, and two flashes may consume more energy, the actual application may not achieve a desirable effect.

CN patent application No. CN 1750017A (published on Mar. 22, 2006) discloses a method for removing red eye by post-processing. The method performs facial recognition on the image where red eye occurs or uses other target detection method for locating the red eye area. Then, the information such as the color in the red eye area is adjusted so as to remove the red eye. However, in such method, the detection speed is slow and is subject to noise and is not precise and can rarely achieve the practical application in handheld or mobile devices.

JP patent application No. 2000-299812A (published on Oct. 24, 2000) discloses a photo taking device. By taking a photo with the flash light and taking a photo without the flash light and extracting the data in the red eye area based on the relation between the two photos, the red eye is removed. However, such method requires taking two photos at the same place at the same time, which extends the photo taking time and decreases the efficiency due to repetitive shooting.

SUMMARY

The present invention is aimed at providing an easy and fast method for automatically detecting and correcting red eye during a photo taking process. Consequently, the pictures with no red eye can be taken without altering the existing digital camera device and decreasing the efficiency.

To this end, the method for automatically detecting and correcting red eye during a photo taking process uses information of an image in preview mode and information of an image actually taken to perform automatic red eye detection and correction. The method includes:

(1) acquiring a shutter pressing time;

(2) acquiring an image from a preview image sequence, which is closest to the shutter pressing time; regarding the image as a correction reference image;

(3) acquiring an image actually taken with a flash lamp and regarding the image as an image to be corrected;

(4) performing red eye detection according to the information of the correction reference image and the image to be corrected; determining a red eye area; and (5) performing red eye correction on the detected red eye area according to the information of the correction reference image and the image to be corrected.

According to the method for automatically detecting and correcting red eye during a photo taking process, the shutter pressing time is any time during a period from pressing the shutter to starting exposure. The corrected image $P_{corrected}$ is the resulting image with red eye being eliminated.

Since the present invention utilizes the image in preview mode which is closest to the shutter pressing time, there is no need to take two photos for a same scene, thus repetitive shooting is avoided. Furthermore, since the present invention does not requires any additional devices as long as the camera has a preview function, the present invention can be practiced easily. In addition, the present invention is able to remove red eye in the red eye area according to the information of the preview image and the information of the image actually taken. Thus, there is no need to perform a series of complex area detection algorithm such as facial recognition and the efficiency is therefore enhanced.

BRIEF DESCRIPTION OF THE DRAWINGS

Detailed description will be made to the present invention in conjunction with embodiments and accompanying drawings.

PREFERRED EMBODIMENT OF THE PRESENT INVENTION

Figure 1:
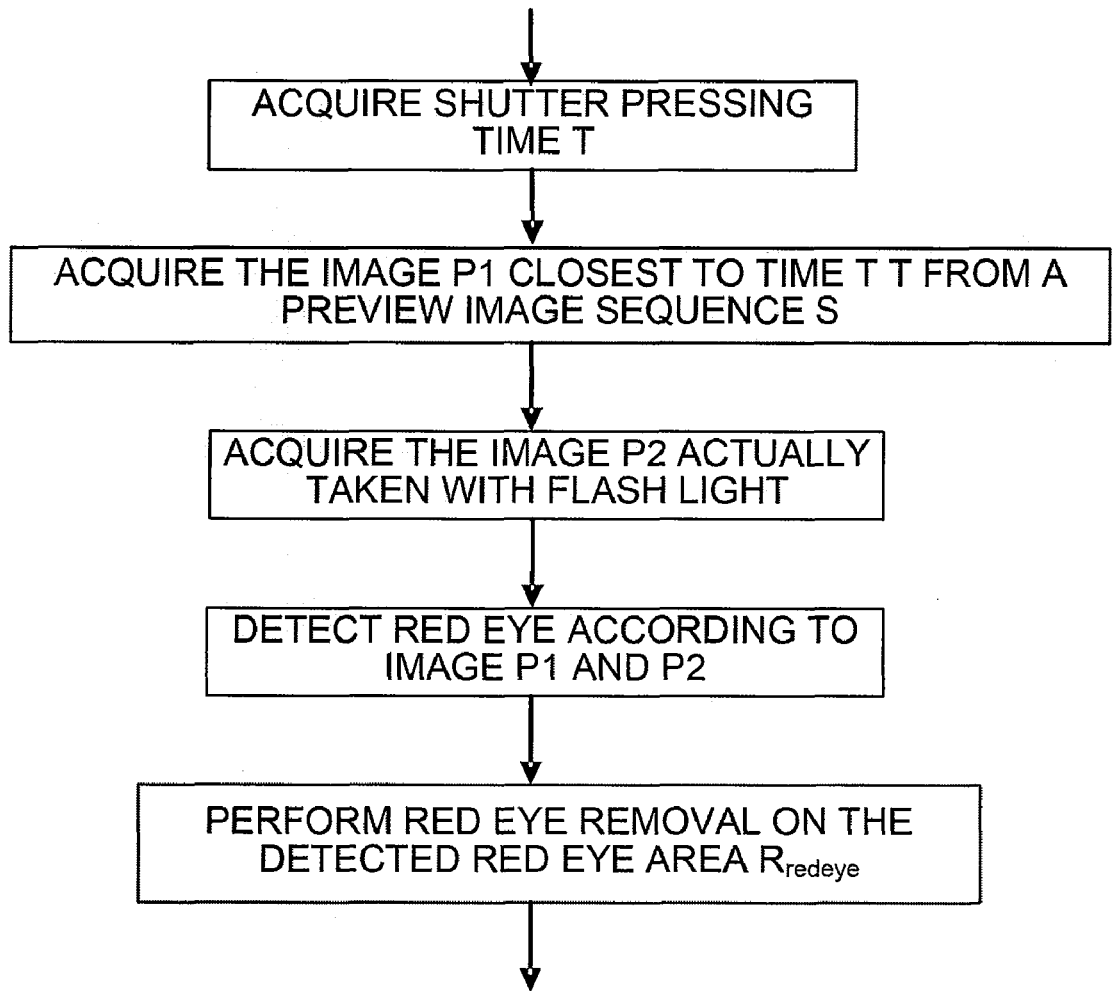
FIG. 1 is a flowchart according to the present invention.

According to the present invention, the red eye detection and correction is based on information of an preview image and information of an image actually taken. The specific implementation flowchart is illustrated in FIG. 1 and detailed as follows.

First, a shutter pressing time T is acquired, i.e., any moment during the period from pressing the shutter to starting exposure.

Then, according to the acquired shutter pressing time T, the image most closely to the shutter pressing time T is acquired from a preview image sequence S. This image serves as a correction reference image P1 and is stored in a temporary storing unit.

Then, a photo taking unit is used to acquire the image taken with the flash light. This image serves as a image to be corrected P2 and is stored in a temporary storing unit.

Then, the related information of the correction reference image P1 and the image to be corrected P2 stored in the temporary unit are then used for detecting the red eye area $R_{redeye}$.

Then, the detected red eye area $R_{redeye}$ is corrected according to the related information of the correction reference image P1 and the image to be corrected P2 and the corrected image $P_{corrected}$ is stored as the resulting image.

Figure 2:
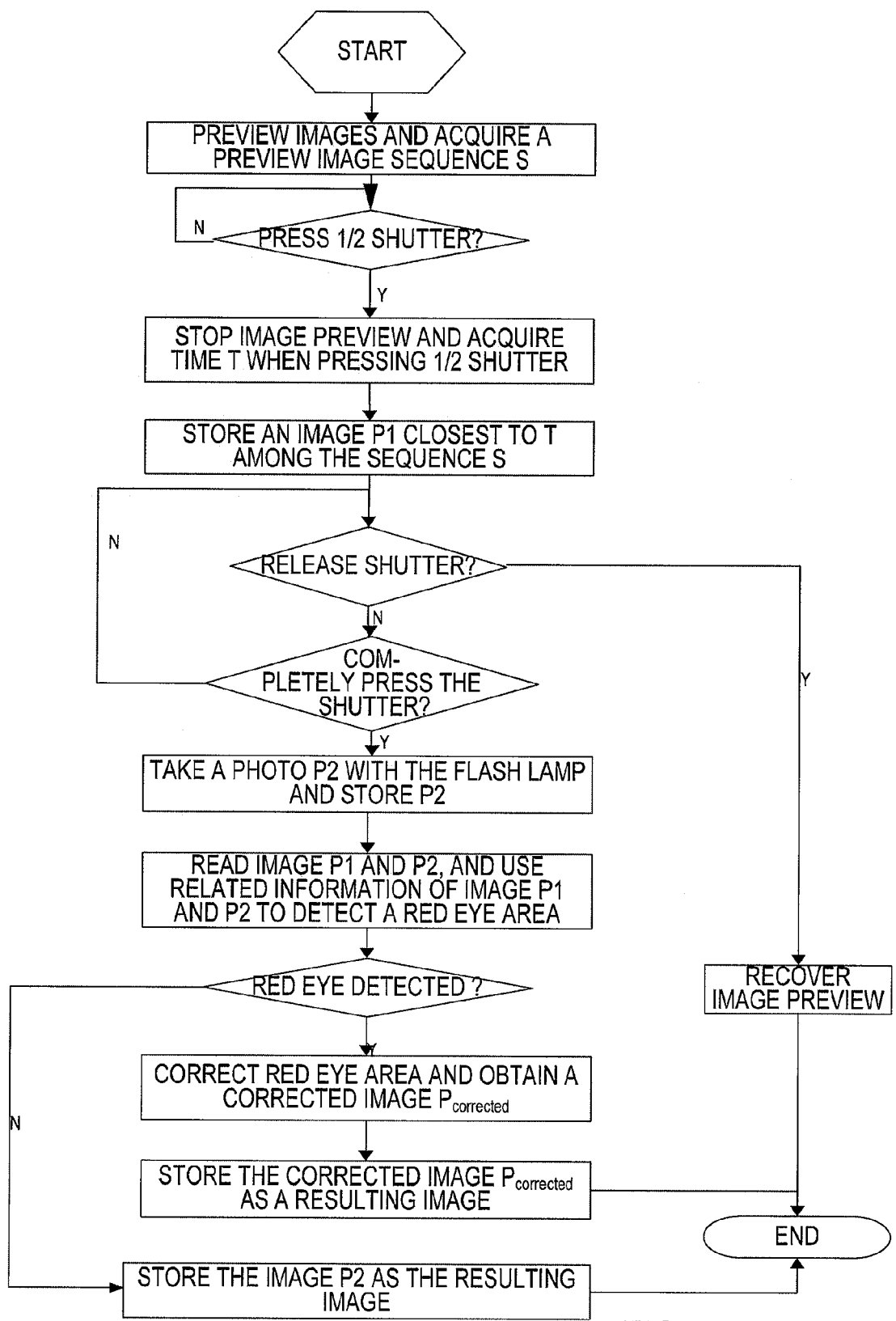
FIG. 2 is an embodiment of the present invention.

Detailed description will be made to the present invention with reference to the embodiment illustrated in FIG. 2.

First, a preview image sequence S is stored in a buffer having a size which can accommodate at least one frame. When the buffer overflows, the principle of first-in-first-out is followed. That is, the first stored image is moved out to release space for storing a new image. Then, the shutter pressing time T is acquired. The shutter pressing time T is any moment during the period from pressing the shutter to staring exposure or the time when pressing ½, ⅓ or ¼ of the shutter (in the embodiment illustrated in FIG. 2, time T is the time when pressing ½ of the shutter). It is detected whether ½ of the shutter is pressed. If not, the process continues to a preview step. If ½ of the shutter has pressed already, preview step is stopped and the shutter pressing time T is recorded at the same time. Then, the image which is closest to the shutter pressing time T is searched among the preview image sequence S and is stored as the correction reference image P1 (usually the last viewed image). The process then waits for the shutter to be pressed thoroughly. If the shutter button is released at that time, the photo taking mode is quitted and the process reverts back to preview mode. If the shutter is pressed thoroughly, a photo is taken with flash light and this photo is stored as the image to be corrected P2. Lastly, the correction reference image P1 and the image to be corrected P2 are read and the red eye area $R_{redeye}$ is detected according to the related information of the two images. If no red eye is detected, P2 is stored as a resulting image; otherwise, the red eye is removed from the detected image and the corrected image $P_{corrected}$ is stored as a resulting image.

Figure 3:
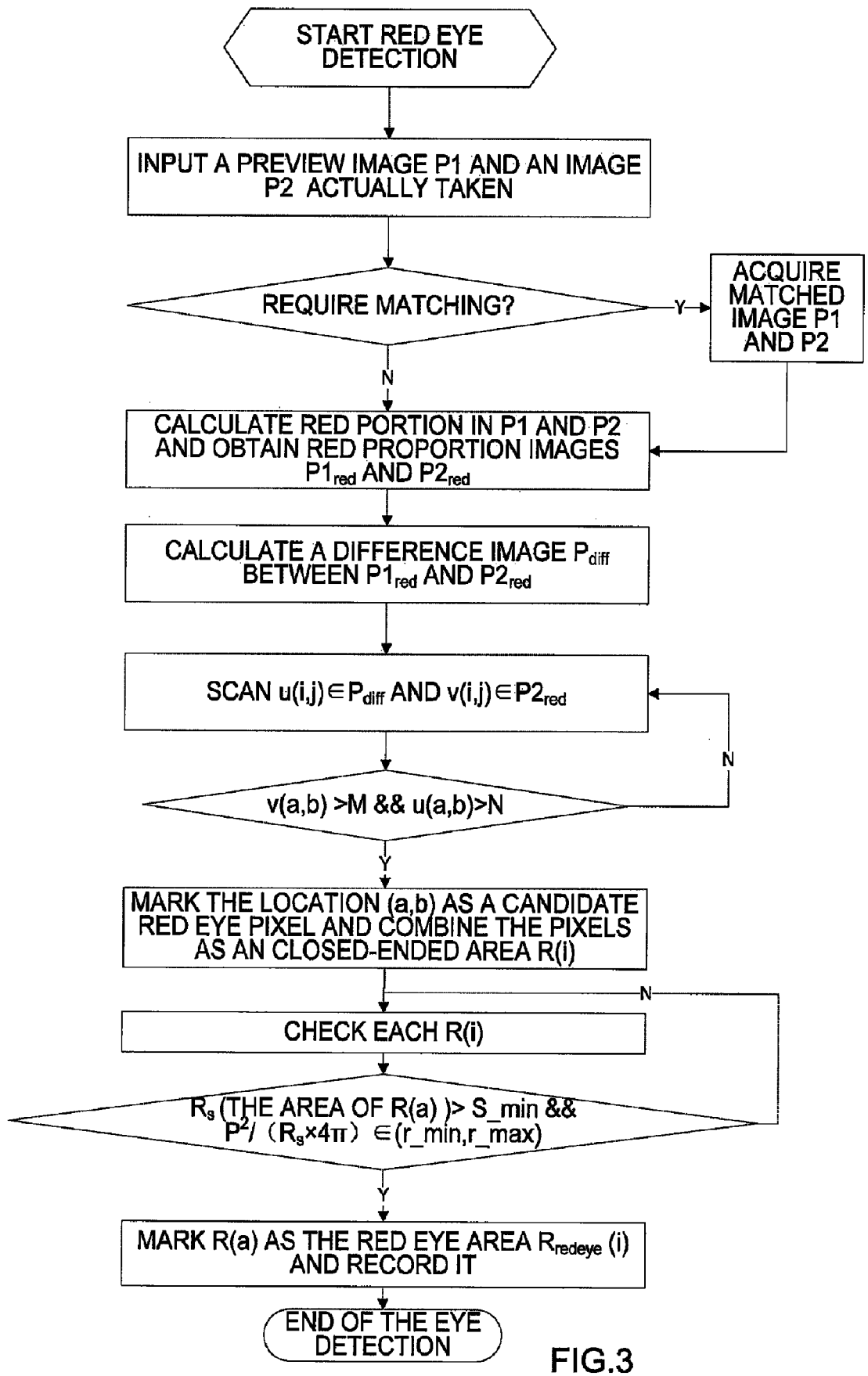
FIG. 3 is an embodiment of detecting red eye according to the present invention.

FIG. 3 is an embodiment of detecting red eye according to the present invention.

First, the correction reference mage P1 and the image to be corrected P2 are input and these two images are checked to see if matching is required. If matching is required, images are matched and a new matched correction reference image P1 and a new matched image to be corrected P2 are obtained. If no matching is required, the method proceeds directly to a next step.

Then, the red proportion among each pixels in the correction reference image P1 and the image to be corrected P2 are calculated, respectively, and red proportion images $P1_{red}$ and $P2_{red}$ are obtained.

Then, the difference between the obtained red proportion images $P1_{red}$ and $P2_{red}$ is calculated and a difference image $P_{diff}$ is thus obtained.

Then, the difference image $P_{diff}$ and the red proportion images $P2_{red}$ are scanned. For any $u(i,j) \in P_{diff}$, and any $v(i,j) \in P2_{red}$, if i=a, j=b and the following conditions are met: ① $u(a,b)>$a predetermined difference threshold M, where M can be 0.07 in one embodiment; ② $v(a,b)>$a given red proportion threshold N, where N can be 0.4 in one embodiment, then the pixel (a,b) is marked as a red eye pixel. After scan is done, the red eye pixels are combined into a different closed-ended area R(i), i.e., candidate red eye area.

Lastly, determination is made on each candidate red eye area R(i). The determination is made based on the following conditions: ① the area $R_s$ of the candidate red eye area R(a)>a given area S_min, wherein S_min is 6 in one embodiment; ② the perimeter of R(a)/the area of $R(a) \in (r\_min, r\_max)$, wherein $r_{min}$ is 0.7 and r_max is 1.3 since R(a) approximates a circle. Therefore, the determination formula is $P^2/(R_s \times 4\pi) \in (0.7, 1.3)$. When i=a and the above conditions are met, area R(a) is recorded as the red eye area $R_{redeye}(i)$; otherwise, it is excluded. The red eye detection process ends until all the R(i) are checked.

Furthermore, the red eye detection according to the present invention may also include converting the image to other color space YUV (a method of indicating color information, where for a color TV in PAL mode, Y indicates luminance, U and V indicates two color differences) or CIELAB (International Commission on Illumination converts the wavelength of the light into a set of data depicting luminance and chroma based on human eye characteristics) before performing red eye detection.

Figure 4:
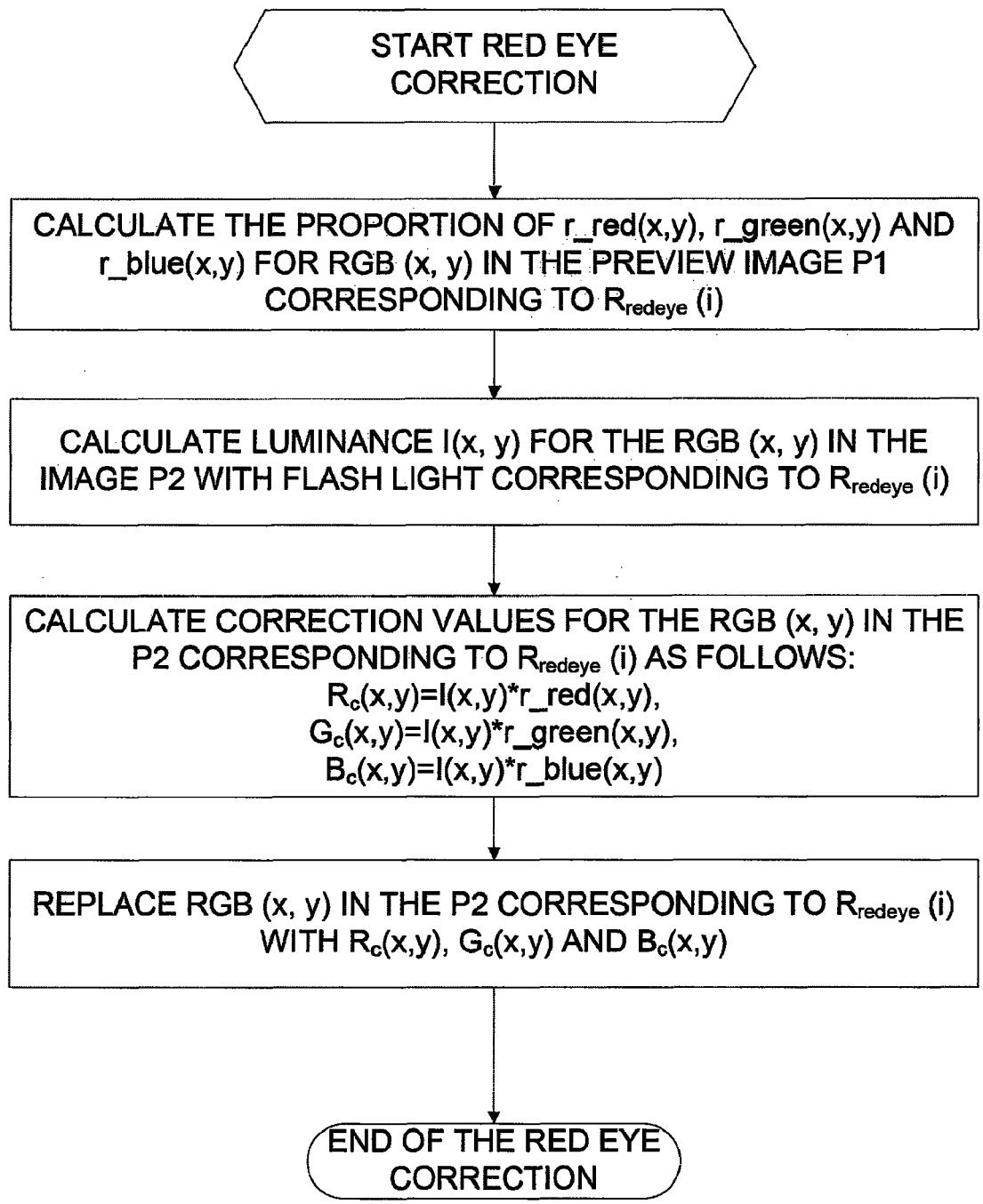
FIG. 4 is an embodiment of correcting red eye according to the present invention.

FIG. 4 is an embodiment of correcting red eye according to the present invention.

First, the proportions of three colors, i.e., r_red(x,y), r_green(x,y), r_blue(x,y), for RGB(x,y) in the correction reference image P1 are calculated, respectively, where $x,y \in R_{redeye}(i)$.

Then, luminance information I(x,y) of the pixel RGB(x,y) in the image to be corrected P2 is calculated, where $x,y \in R_{redeye}(i)$ The value of tricolor in red eye area $R_{redeye}$ is then calculated according to a corresponding correction formula, which is expressed as follows: $R_c(x,y)=I(x,y)*r\_red(x,y)$, $G_c(x,y)=I(x,y)*r\_green(x,y)$, $B_c(x,y)=I(x,y)*r\_blue(x,y)$.

Then, the pixel value in the red eye area $R_{redeye}$ in the image to be corrected P2 is replaced with correction value $R_c G_c B_c$. The red eye removal process ends.

What is claimed is:

1. A method for automatically detecting and correcting red eye in a photo taking process, characterized in that, information of an image in preview mode and information of an image actually taken are used to perform automatic red eye detection and correction, comprising:
    providing a camera having a preview function to perform a preview image sequence;
    acquiring a shutter pressing time by the camera;
    acquiring an image from a preview image sequence, which is closest to the shutter pressing time by the camera, and regarding the image as a correction reference image;
    acquiring an image actually taken with a flash lamp by the camera and regarding the image as an image to be corrected;
    performing red eye detection by the camera according to the information of the correction reference image and the image to be corrected, and determining a red eye area; and
    performing red eye correction on the detected red eye area by the camera, and utilizing the information of the correction reference image and the image to be corrected.

2. The method of claim 1, characterize in that, the step of acquiring the shutter pressing time by the camera is any time during a period from pressing a shutter of the camera to starting exposure of the camera.

3. The method of claim 1, characterize in that, the step of acquiring the shutter pressing time by the camera is time when pressing ½, ⅓ or ¼ of a shutter of the camera.

4. The method of claim 1, characterize in that, the step of performing red eye detection by the camera comprises:

determining whether the correction reference image and the image to be corrected need to be matched, and matching the correction reference image and the image to be corrected if it is determined that the correction reference image and the image to be corrected need to be matched;

calculating values effectively indicating red portion information in the correction reference image and the image to be corrected, and obtaining red proportion images of the correction reference image and the image to be corrected, respectively;

processing a difference between the red proportion image in the correction reference image and the red proportion image in the image to be corrected, and obtaining a difference image;

determining a candidate red eye area using the red proportion image of the image to be corrected and the difference image; and further selecting a red eye area and determining a resulting red eye area.

5. The method of claim 1, characterized in that, the step of performing red eye detection by the camera comprises converting the image to other color space YUV or CIELAB for processing and performing red eye detection processing, wherein the information of the correction reference image and the image to be corrected comprises original information of an image and information of an image generated after processing.

6. The method of claim 1, characterize in that, the step of performing red eye correction by the camera comprises:

calculating values of color proportion for an pixel in the red eye area in the correction reference image;

calculating a luminance for an pixel in the red eye area in the image to be corrected;

calculating a correction value for an pixel in the red eye area in the image to be corrected; and replacing a pixel in the red eye area of the image to be corrected with its corresponding correction value.

* * * * *